United States Patent [19]
Koch

[11] Patent Number: 5,609,252
[45] Date of Patent: Mar. 11, 1997

[54] PHOTOGRAPH DISPLAY AND STORAGE TRAY SYSTEM

[75] Inventor: Richard C. Koch, Rancho Santa Margarita, Calif.

[73] Assignee: View 'N Store, Inc., Rancho Santa Margarita, Calif.

[21] Appl. No.: 426,028

[22] Filed: Apr. 21, 1995

[51] Int. Cl.⁶ ............................. B65D 85/30; A47G 1/06
[52] U.S. Cl. ......................... 206/455; 206/449; 40/508; 40/700
[58] Field of Search ...................... 206/455, 456, 206/454, 449, 555, 559; 40/511, 508, 513, 152, 700

[56] References Cited

U.S. PATENT DOCUMENTS

| D. 258,027 | 1/1981 | Rache et al. ...................... 206/449 X |
| 877,078 | 1/1908 | Havenhill et al. ................. 206/456 X |
| 2,627,343 | 2/1953 | Gallagher ........................... 206/559 X |
| 4,288,899 | 12/1980 | Ackeret ..................................... 40/513 |
| 4,473,154 | 9/1984 | Ackeret .................................. 206/455 |
| 4,801,016 | 1/1989 | Irrgeher .................................. 206/455 |
| 4,869,006 | 9/1989 | Ackeret ..................................... 40/511 |
| 4,970,813 | 11/1990 | Ackeret ..................................... 40/511 |
| 5,038,935 | 8/1991 | Wenkman et al. ..................... 206/455 |
| 5,044,101 | 9/1991 | Ackeret ..................................... 40/511 |

OTHER PUBLICATIONS

Flyers of photographic storage systems. five unnumbered pages from Los Angeles Jan. 1995 show.

*Primary Examiner*—Paul T. Sewell
*Assistant Examiner*—Tara L. Laster
*Attorney, Agent, or Firm*—Loeb & Loeb LLP

[57] ABSTRACT

A display and storage tray for a stack of photographs, card-like objects or the like, includes a housing, a retaining member, a plurality of slots, at least one guiding member and a lifting member. The housing has an interior that forms a recess that is adapted to hold the stack of photographs. The retaining member is coupled to the housing to retain the stack of photographs within the recess of the housing. A first opening slot is formed between the guiding member and the retaining member, and is adapted to permit the removal of one of the photographs from the stack at a time. A guiding member is coupled to or formed as a part of the housing to guide a photograph back to the bottom of the stack of photographs when one photograph is to be placed back in the stack of photographs in the recess of the housing. A second opening slot is formed between the back of the housing and the a guiding member, and is adapted to permit insertion of one or more photographs to the bottom of the stack of photographs. A lifting member is coupled to the housing and is adapted to press against the bottom of the stack of photographs. The lifting member helps to maintain the stack of photographs within the recess of the housing. The back surface of the housing is configured to form a channel with an opening that leads from the interior to an exterior of the housing. This channel is used to hold the negatives that were used to produce the plurality of photographs contained within the housing. The tray includes a frame support tab and at least one tab slot for receiving the frame support tab. The frame support tab is inserted into the tab slot to support the tray in an orientation that permits the tray to be used as a photograph frame.

19 Claims, 7 Drawing Sheets

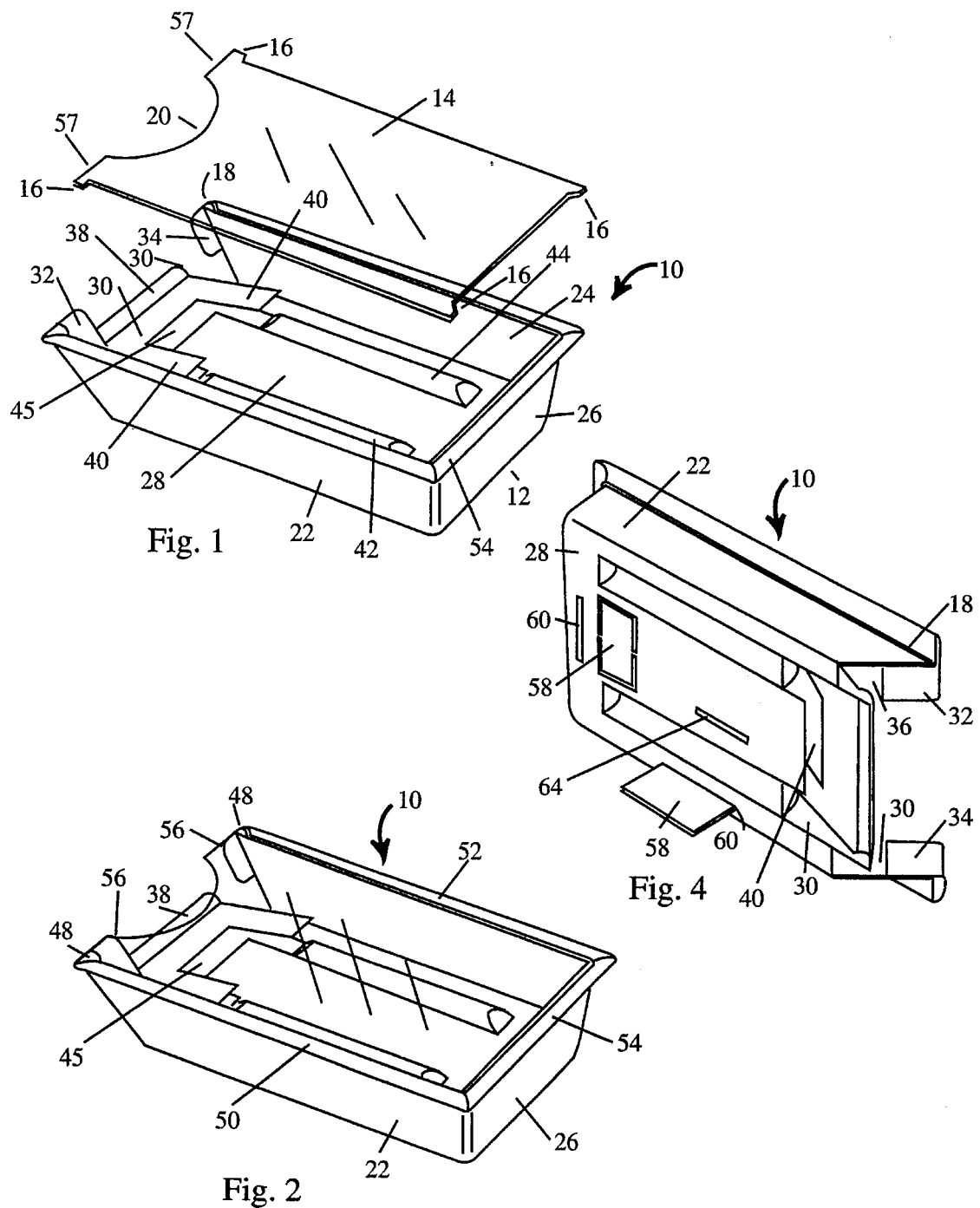

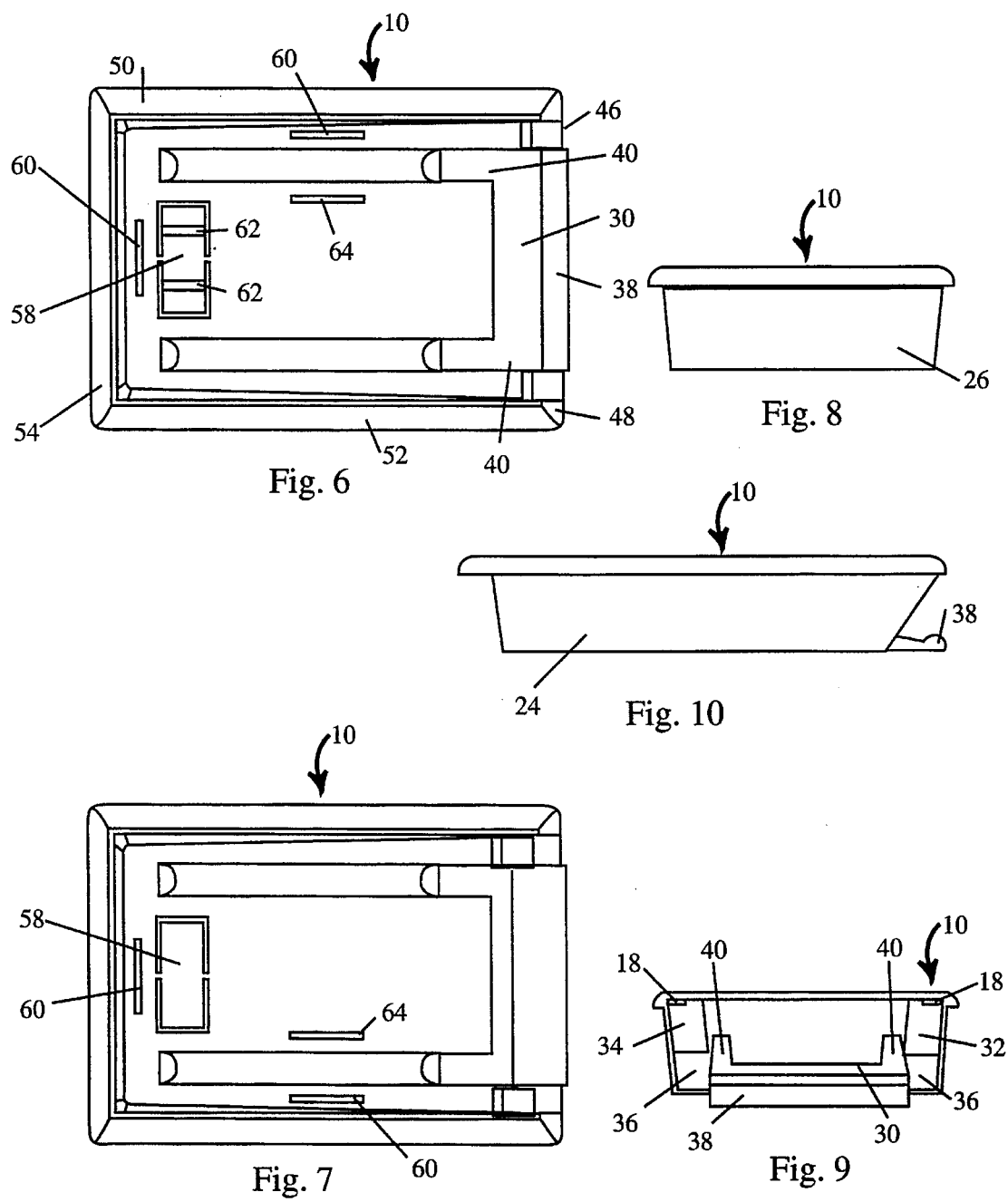

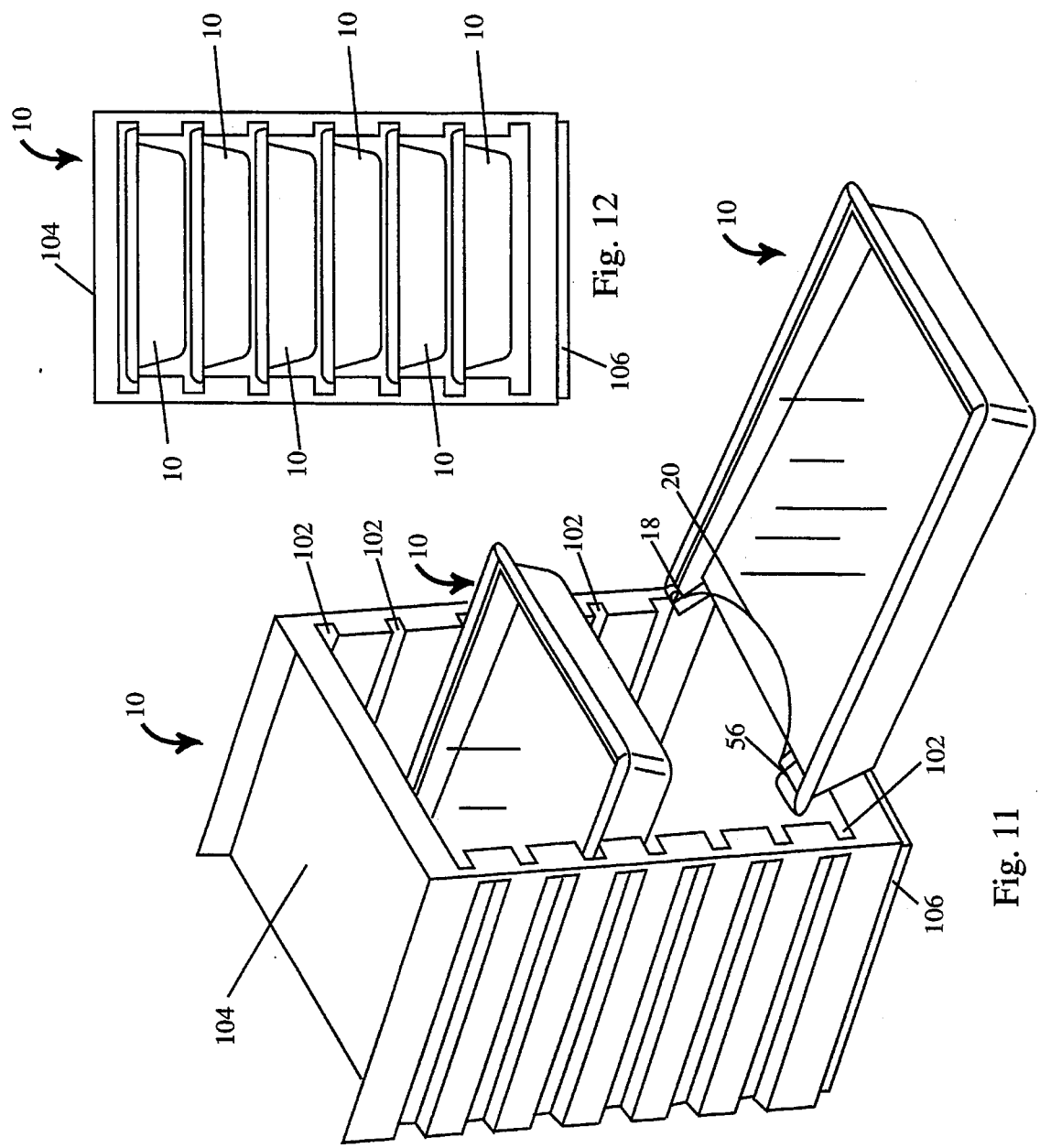

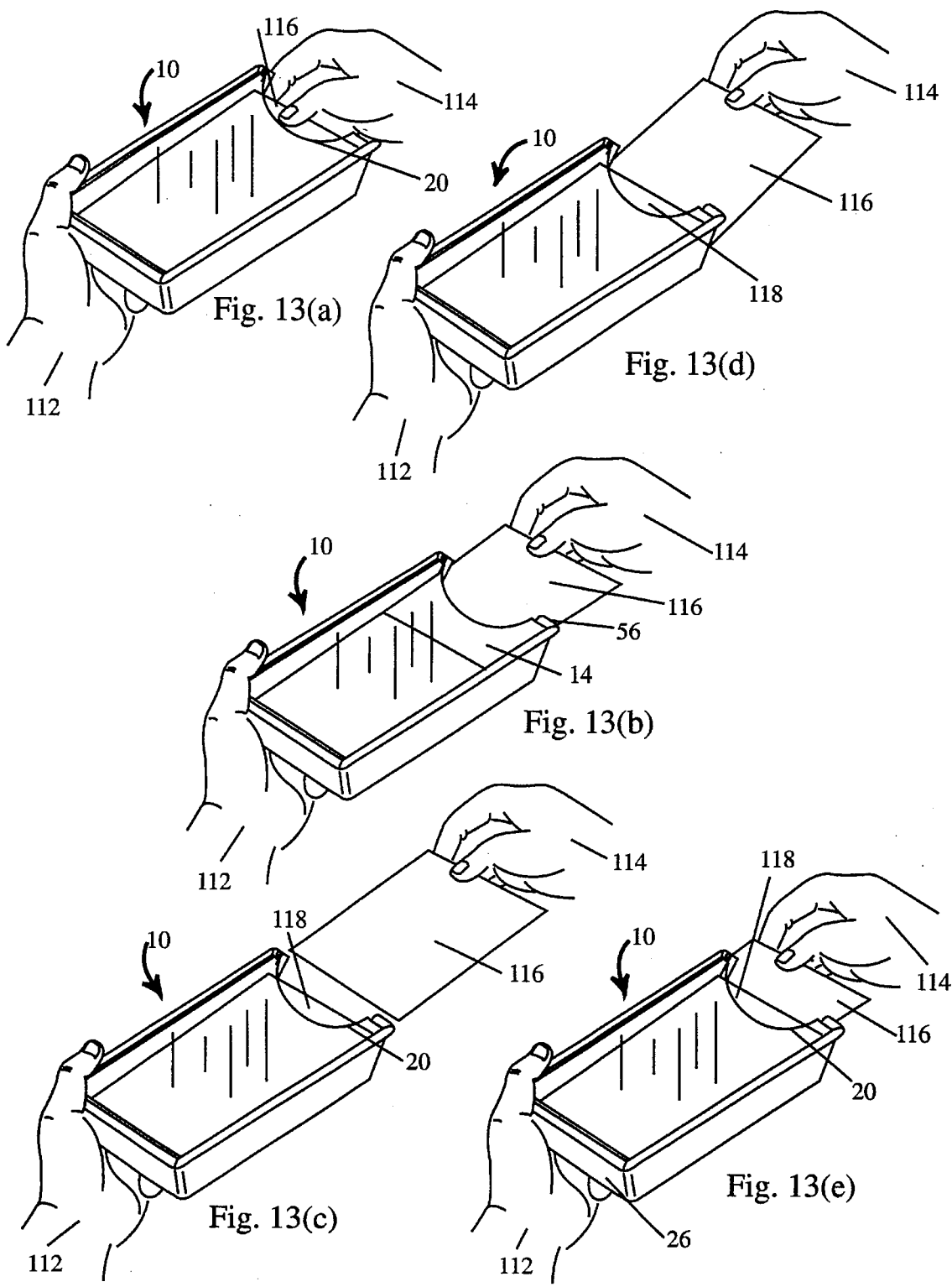

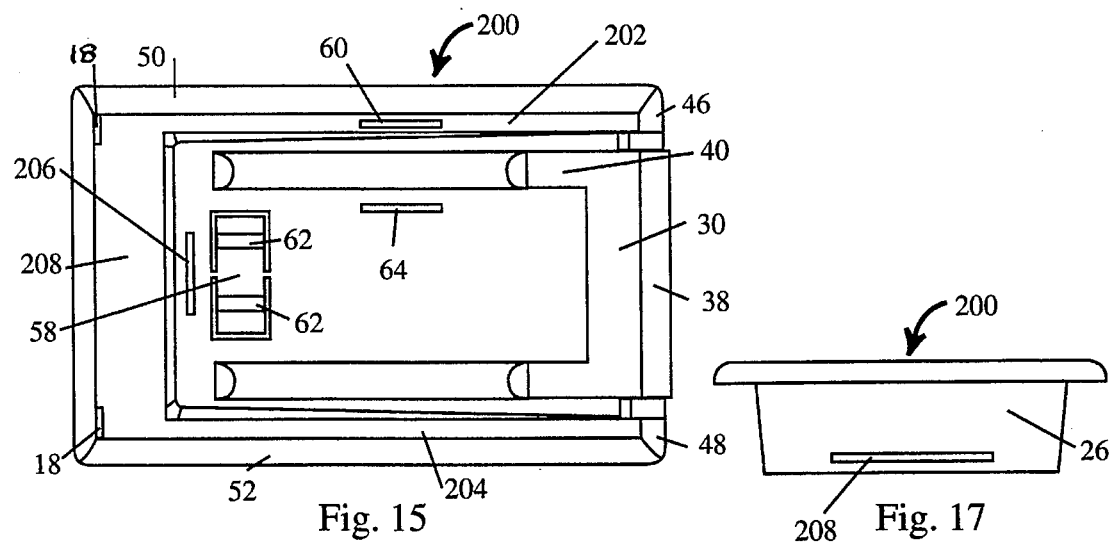
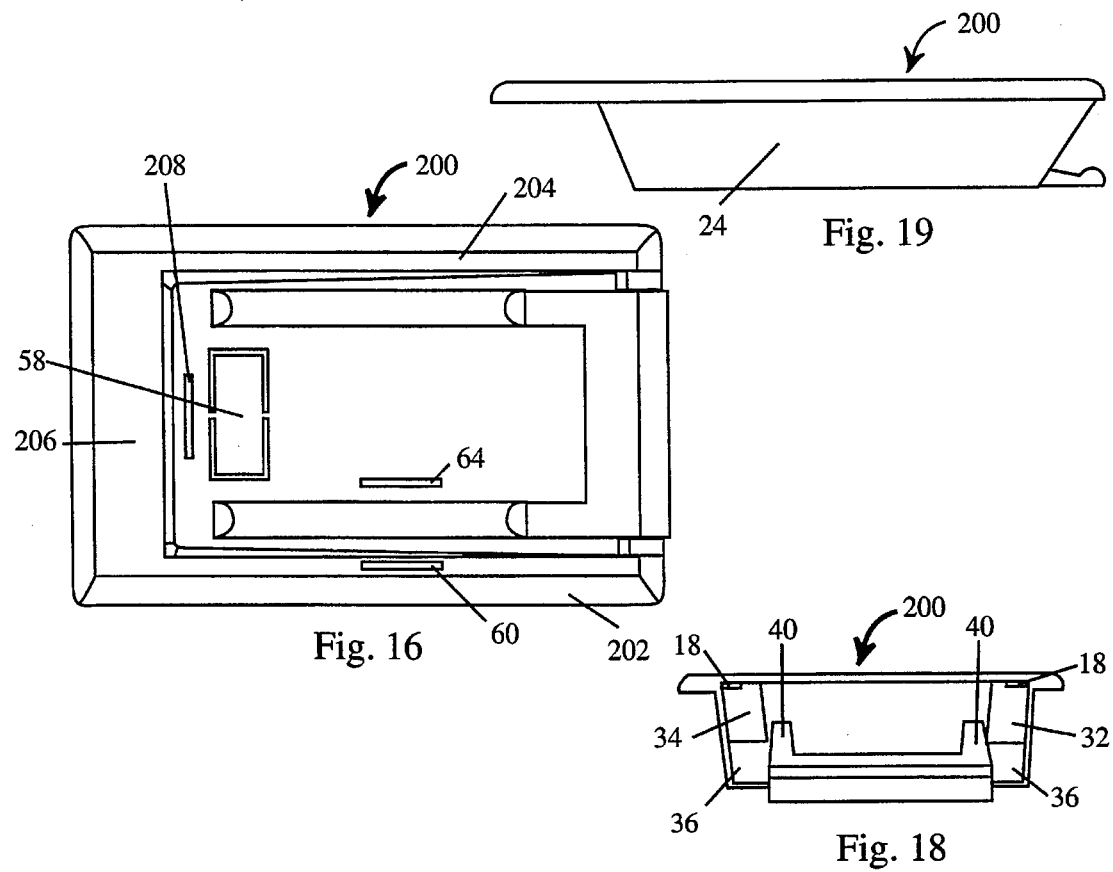

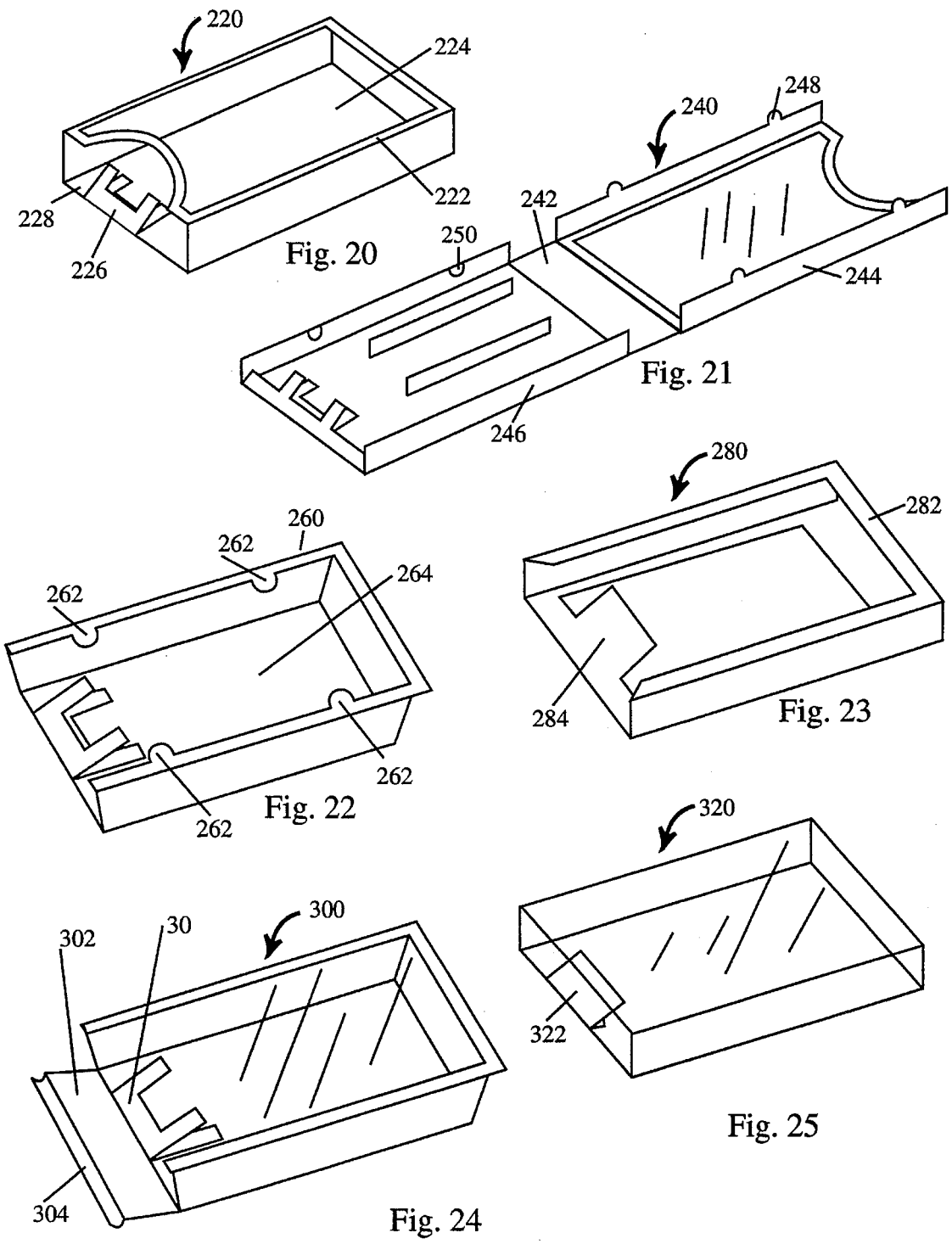

PHOTOGRAPH DISPLAY AND STORAGE TRAY SYSTEM

FIELD OF THE INVENTION

This invention relates to photograph display trays and, in particular embodiments, a manual display and storage system for both photographs and negatives.

BACKGROUND OF THE INVENTION

Traditionally, photographs are displayed in picture frames that are either mounted to a wall or displayed on a desk. A large number of photographs are displayed in this manner. One drawback to picture frames is that you can only display one picture at a time (or a few pictures that are separated by matting within a large frame) and it is difficult to quickly or easily change the picture in the frame. Also, negatives corresponding to the displayed photograph cannot be stored with the photographs.

An alternative approach is the photograph album, which can hold a large number of photographs. The pictures are mounted on sheets and held in place by tabs or a glassine sheet overlay. To view the photographs, a person turns the pages. However, albums may be difficult to display on a desk and the album normally cannot be mounted to the wall. Also, it is inconvenient to store negatives with their displayed photographs.

Another alternative approach is to store the photographs with the negatives in a storage box. This may make it easier to store and organize the photographs, but it does not facilitate their display.

Still another alternative approach is a photographic box that allows the user to cycle through the pictures stored in the box. The user utilizes a mechanical sorting mechanism to move one picture from a front position to a position at the end of the stored pictures. Drawbacks to this system result from the mechanical sorting mechanism wearing out as the springs in the mechanism weaken. Also, these devices do not have the ability to store the negatives with the photographs in the box. Further, the device tends to be bulky and costly, and thus it may be expensive to have a plurality of devices for multiple sets of photographs.

SUMMARY OF THE DISCLOSURE

It is an object of an embodiment of the present invention to provide an improved photographic display and storage tray that can be used as a system, and which obviates for practical purposes, the above-mentioned limitations.

According to an embodiment of the invention, a photograph display and storage tray for a stack formed by a plurality of photographs, card-like objects or the like, includes a housing, a retaining member, a plurality of slots, at least one guiding member and a lifting member. The housing has an interior that forms a recess adapted to hold the stack. The retaining member is coupled to the housing to retain the stack that is contained within the recess of the housing.

A first opening slot is formed between the at least one guiding member and the retaining member, and is adapted to permit the removal of one of the photographs from the stack one at a time. The at least one guiding member is coupled to or formed as a part of the housing to guide the one photograph back to the bottom of the stack of photographs when the one photograph is to be placed back in the stack in the recess of the housing. A second opening slot is formed between the back of the housing and the at least one guiding member, and is adapted to permit insertion of one or more photographs into bottom of the stack of photographs.

The lifting member is coupled to the housing, and is adapted to press against the bottom of the stack of photographs. The lifting member helps to maintain the stack within the recess of the housing. In preferred embodiments, the lifting member prevents the photographs at the bottom of the stack from passing out through the second opening slot.

In particular embodiments, the retaining member forms a lip that overlaps the edges of the stack of photographs to maintain the photographs within the recess of the housing. In preferred embodiments, the retaining member is a transparent cover that covers the recess in the housing and the stack of photographs. Also, the transparent cover may be removable to permit easy insertion of an entire stack of photographs, such as when the device is initially loaded.

Preferred embodiments of the tray are formed from plastic materials. However, in alternative embodiments, other materials, such as paper, metal, wood, ceramics or composites may be used.

In further embodiments, the back of the housing is configured to form a channel with an opening that leads from the interior to an exterior of the housing. This channel is used to hold the negatives that were used to produce the photographs contained within the housing. In preferred embodiments, the channel is formed by a pair of indentations formed in the back of the housing which extend into the recess in the interior of the housing. The indentations also provide support for the stack of photographs.

In further preferred embodiments the tray includes a frame support tab and at least one tab slot for receiving the frame support tab. The frame support tab is inserted into the tab slot to support the tray in an orientation that permits it to be used as a photograph frame.

Other features and advantages of the invention will become apparent from the following detailed description, taken in conjunction with the accompanying drawings which illustrate, by way of example, various features of embodiments of the invention.

BRIEF DESCRIPTION OF THE DRAWINGS

A detailed description of embodiments of the invention will be made with reference to the accompanying drawings, wherein like numerals designate corresponding parts in the several figures.

FIG. 1 is an exploded perspective view of a tray in accordance with a first embodiment of the present invention.

FIG. 2 is a top perspective view of the tray of the first embodiment shown in FIG. 1.

FIG. 4 is a back perspective view of the tray of the first embodiment shown in FIG. 1.

FIG. 6 is a top plan view of the tray of the first embodiment shown in FIG. 1.

FIG. 7 is a bottom plan view of the tray of the first embodiment shown in FIG. 1.

FIG. 8 is one end view of the tray of the first embodiment shown in FIG. 1.

FIG. 9 is an opposite end view of the tray of the first embodiment shown in FIG. 1.

FIG. 10 is a side view of the tray of the first embodiment shown in FIG. 1.

FIG. 11 is a perspective view of a tray in accordance with the first embodiment with a organizer rack in accordance with an embodiment of the present invention.

FIG. 12 is a front plan view of a fully-loaded organizer rack in accordance with an embodiment of the present invention.

FIGS. 13(a)-13(e) illustrate the steps of a method of cycling through a stack of photographs using the tray in accordance with the first embodiment of the present invention.

FIG. 15 is a top plan view of the tray of the second embodiment shown in FIG. 14.

FIG. 16 is a bottom plan view of the tray of the second embodiment shown in FIG. 14.

FIG. 17 is one end view of the tray of the second embodiment shown in FIG. 14.

FIG. 18 is an opposite end view of the tray of the second embodiment shown in FIG. 14.

FIG. 19 is a side view of the tray of the second embodiment shown in FIG. 14.

FIG. 20 is a perspective view of a tray in accordance with a third embodiment of the present invention.

FIG. 21 is a perspective view of a tray in accordance with a fourth embodiment of the present invention.

FIG. 22 is a perspective view of a tray in accordance with a fifth embodiment of the present invention.

FIG. 23 is a perspective view of a tray in accordance with a sixth embodiment of the present invention.

FIG. 24 is a perspective view of a tray in accordance with a seventh embodiment of the present invention.

FIG. 25 is a perspective view of a tray in a accordance with an eighth embodiment of the present invention.

DETAILED DESCRIPTION OF THE PREFERRED EMBODIMENTS

Figure 3:
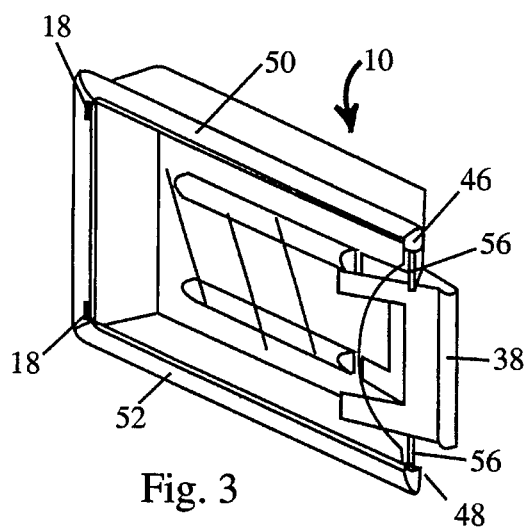
FIG. 3 is a front perspective view of the tray of the first embodiment shown in FIG. 1.

As shown in the drawings for purposes of illustration, the invention is embodied in a photograph display and storage tray. In preferred embodiments of the present invention, the tray is adapted to hold and display photographs. However, it will be recognized that further embodiments of the invention may be used to hold and display other card-like objects, such as printed cards, baseball cards, lithographs, artwork, note paper, recipe cards, index cards, or the like. Also, the tray may be adapted to hold and display more than a single stack of photographs; for example, trays may hold two stacks of photographs in a side- by-side relationship.

Preferred embodiments of the photograph display and storage tray are designed to appear like and be used as a photograph frame when stood on edge. A tab is inserted in a slot formed on the back of the tray to provide support for the tray when it is in an upright orientation on a surface such as a table, shelf, or the like. Alternatively, the tray may use a hole in the housing for receiving a nail or hook for hanging on the wall, or may be provided with a magnet to attach to metal objects, such as a cabinet, refrigerator or the like.

The trays provide a storage channel or pocket on the back of the tray for conveniently holding the negatives that were used to produce the photographs contained in the tray. This facilitates easy access to corresponding negatives when reprints are desired. Thus, photographs and negatives can be stored in a single displayable storage unit.

The tray has a plurality of slots and guidance tabs on one end of the tray permitting the user to circulate quickly through the stack of photographs to select a desired photograph for display. The upper slot permits the user to extract one photograph at a time to expose the next photograph down in the stack. The guidance tabs are set at angles to direct a photograph pressed against the side of the tray toward a second slot on the tray. This second slot is positioned below the bottom of one end of the photograph stack to permit the user to insert the photograph at the bottom of the stack. In preferred embodiments, the guidance tabs only extend part way across the side of the tray, to provide an opening that allows the user's fingers to grasp the photographs contained in the tray. However, in alternative embodiments, the guide tabs may be formed as a single member that extends all the way across the side of the tray.

A lifting member presses against one end of the bottom of the stack of photographs. This lifts and positions the end of the stack above the second slot in the side of the tray so that a photograph can be inserted easily into the bottom of the stack. Lifting the end of the stack of photographs also prevents the photographs from sliding back out of the tray through the second slot. In preferred embodiments, the lifting member is formed as part of the tray, as a wedge or ramp. In alternative embodiments, the lifting member may be formed apart from the tray and affixed to the tray, or the lifting member may be made from other materials and may use a spring to lift the stack of photographs.

In preferred embodiments, the trays are produced in a standard exterior size so that they may be stacked and loaded in an organizer rack regardless of the size of the photographs. This permits the user to stack, for example, 4"×6" photographs with 3.5"×5" photographs in a single rack. In particular embodiments, the organizer racks may be stacked one on top of another to provide a modular storage system. Thus, the trays may be stacked in a manner similar to that used for CDs, cassette tapes or the like. In alternative embodiments, the trays may be made in different sizes or shapes.

In further embodiments, one end of the tray is sized and textured to hold a label, on which identifying information may be placed. The information can, for example, identify the subject or event, identify the date of event, or index the contents of the tray.

Preferred embodiments of the trays are formed by plastic injection molding or vacuum forming techniques to facilitate manufacture and reduce the cost of the tray. The transparent cover is preferably die cut. The base of the tray is formed from polystyrene or polypropylene, and the transparent cover is made from PETG, polystyrene, acetate or acrylic. However, in alternative embodiments, the base of the tray may be made from other materials such as paper, cardboard, wood, metal, ceramics, composites, or the like; and the transparent cover may be made from other suitable materials, such as plastic, glass, or the like.

FIGS. 1–10 show a photograph display and storage tray 10 in accordance with a first embodiment of the present invention. The tray 10 includes a base housing 12 and a transparent cover 14. The transparent cover 14 is adapted to be coupled to the housing 12 to contain a stack of photographs, or the like, within the housing 12.

In preferred embodiments, the housing 12 is produced by injection molding or vacuum forming techniques, and is made with polystyrene or polypropelene. The transparent cover 14 is produced by die cutting and is made from PETG, polystyrene, acetate or acrylic. In alternative embodiments, different manufacturing methods may be used, such as assembly from multiple parts or the like. Also, different materials may be used for the base housing 12, such as paper, cardboard, other plastics, metal, ceramics, composites, or the like; and the transparent cover 14 may be formed of plexiglass, glass, crystal, or the like. In addition, alternative embodiments of the transparent cover may incorporate magnifiers to increase the apparent size of the photographs contained within the tray 10.

As shown in FIGS. 1–3, the transparent cover 14 is a flat piece of material that has a plurality of tabs 16 at each corner. The tabs 16 are used to couple the transparent cover 14 to the base housing 12 of the tray 10 by a plurality of corresponding tab slots 18 in the base housing 12 (see FIGS. 1 and 9). The transparent cover 14 is used to retain the stack of photographs in the housing 12 when storing or displaying the top photograph. In preferred embodiments, the transparent cover 14 has a notch 20 cut in one end of the transparent cover 14 that facilitates grasping and removing of a photograph contained within the tray 10.

The base housing 12 includes a plurality of side walls 22 and 24, an end wall 26 and a bottom 28 to provide an interior surface that forms a recess in the housing 12 for holding a stack of photographs that are to be displayed, stored and cycled within the tray 10. Also coupled to the bottom 28 of the housing 12 is a lifting member 30 that lifts and positions one end of the bottom of the stack of photographs contained within the housing 12.

Connected to one end of each of the side walls 22 and 24 of the housing 12 are a pair of guidance tabs 32 and 34. A space between the bottom 28 of the housing 12 and the guidance tabs 32 and 34 forms a slot 36 (see FIG. 9). In particular embodiments, the lifting member 30 may also form a part of the slot 36. This slot 36 is used to return photographs to the bottom of the stack of photographs contained within the housing 12.

In preferred embodiments, the lifting member 30 is formed like a ramp to lift and position one end of the stack of photographs contained within the housing 12 above the slot 36 to facilitate the sliding of a photograph to the bottom of the stack of photographs.

As shown in FIGS. 1–5, the lifting member 30 has a rounded end 38 which smoothly guides a photograph onto an angled ramp portion 40 of the lifting member 30 so that the photograph passes through the slot 36 and contacts the bottom of the stack of photographs. The guidance tabs 32 and 34 are also angled to direct the photograph through the slot 36 so that it contacts the bottom of the stack of photographs. Both the ramp portion 40 of the lifting member 30 and the guidance tabs 32 and 34 aid the user in inserting the top photograph into the bottom of the stack of photographs without requiring precise accuracy and coordination by the user. In preferred embodiments, the ramp portion 40 deflects and acts as a spring bias to lift S the bottom of the stack above the second opening 36.

Once the photograph passes through the slot 36, an end of the photograph contacts the bottom of the stack of photographs; and as the user pushes the photograph into the housing 12, the photograph is pushed between the bottom of the stack of photographs and the ramp 40 of the lifting member. After the photograph is pushed all the way into the housing 12 beyond the guidance tabs 32 and 34, it is positioned at the bottom of the stack of photographs and is ready to be cycled through the tray 10.

Figure 5:
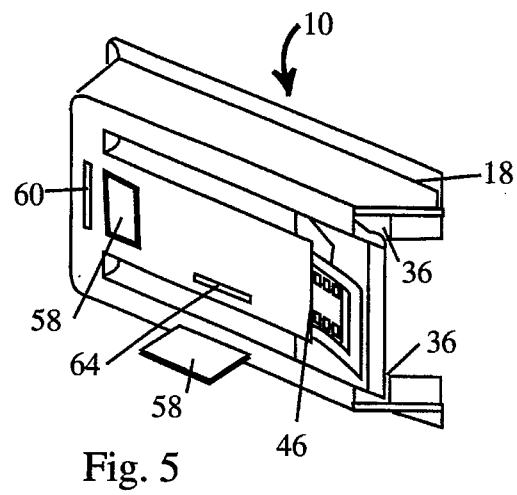
FIG. 5 is another back perspective view of the tray of the first embodiment in FIG. 1, shown holding negatives.
Figure 14:
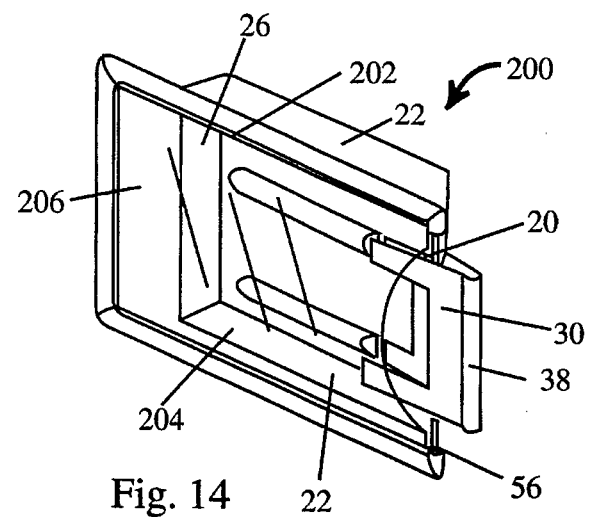
FIG. 14 is a front perspective view of a tray in accordance with a second embodiment of the present invention.

As shown in FIGS. 1–7, the bottom 28 of the base housing 12 includes a plurality of channel rails 42 and 44 that extend into the recess formed in the housing 12. The channel rails 42 and 44 perform as rail guides that help facilitate sliding the photographs into the bottom of the stack of photographs by minimizing the surface contact area of the photograph that contacts the bottom 28 of the housing 12. As shown in FIGS. 3–5, the channel rails 42 and 44 also form a channel or pocket with an opening; 45 underneath the lifting member 30 that permits a user to slide negatives into this channel through the opening 45 while minimizing contact with the bottom of the stack of photographs contained within the housing 12. This enables the user to store both the photographs and the corresponding negatives used to produce the photographs in a single tray 10.

As shown in FIGS. 1–3 and 6, along the edges of the guidance tabs 32 and 34, the side walls 22 and 24, and the end wall 26 are a plurality of frame members 46, 48, 50, 52, and 54, respectively, resembling a picture frame. These frame members 46, 48, 50, 52 and 54 provide the tray 10 with a finished look when the tray 10 is used for display purposes. In preferred embodiments, the frame members 46 and 48 do not extend across the notch 20 of the transparent cover 14, since the notch 20 facilitates insertion and removal of photographs from the stack of photographs. In further embodiments, the rounded end 38 of the lifting member 30 may be shaped to have a rounded texture, similar to that of the frame members, and be positioned so that it appears as a portion of the frame when viewing the tray 10 from a distance.

As shown in FIGS. 2 and 3, when the transparent cover 14 is coupled to the base housing 12 by the plurality of tabs 16 engaging the corresponding tab slots 18 in the housing 12, a slot 56 is formed for removing one photograph at a time. In operation, the user grasps a photograph on the top of the stack of photographs exposed in the notch 20 of the transparent cover 14. Then the user slides the photograph towards the end 57 of the transparent cover 14 and the upper edges of the guidance tabs 32 and 34. The single photograph then slides through the notch 56 and is pulled out from the tray 10. In preferred embodiments, the slot 56 formed between the transparent cover 14 and the guidance tabs 32 and 34 is slightly narrower than the thickness of the photograph to keep the photographs inside tray 10 until the user grasps and removes a photograph. For example, the transparent cover 14 and the guidance tabs 32 and 34 flex slightly to expand the width of the slot 56 when the photograph is removed. In alternative embodiments, the slot 56 is a fixed width and may be slightly wider than the thickness of the photograph.

As shown in FIGS. 4–7, on the bottom 28 of the base housing 12 is a frame support tab 58 that is formed as a part of the bottom 28. The frame support tab 58 is removable and can be inserted into a plurality of corresponding frame tab slots 60. To use the tray 10 as a frame, the user breaks or snaps out the frame support tab 58 and inserts it in a frame tab slot 60. After which the tray 10 can be stood on its side in either a portrait or a landscape orientation to serve as a picture frame for the photograph displayed on the top of the stack photographs contained within the tray 10. In alternative embodiments, the frame support tab 58 may be provided as a separate piece, instead of being formed as a part of the bottom 28 of the housing 12.

When the tray 10 is not being used as a picture frame, the frame support tab 58 is removed from the frame tab slot 60 and may be stored on the bottom 28 of the base housing 12. Each frame support tab 58 is provided with two sub-tabs 62 on one surface of the frame support tab 58. The sub-tabs 62 are sized to fit the width of the frame tab slot 60 and a storage tab slot 64 on the bottom 28 of the housing 12. The sub-tabs 62 keep the frame support tab 58 in a fixed position when it is not being used and helps prevent the frame support tab 58 from being lost.

In alternative embodiments, the tray may include a plurality of holes for receiving a nail, screw or the like, to mount the tray 10 to a wall. In still further embodiments, the bottom 28 of the tray may be provided with one or more magnets suitable for holding the tray 10 and a stack of photographs on a refrigerator, metallic cabinet, other metal surface or the like, to display the photographs contained within the tray 10.

In preferred embodiments, the end wall 26 of the base housing 12 is adapted in size and texture to accept a label to be written on to provide identifying information regarding the stack of photographs contained within the tray 10. The identifying information typically includes the subject, the date and/or an index of the photographs contained within the display storage tray 10. An adhesive label (not shown) may be used or the housing 12 may include tab guides (not shown) to secure a label card (not shown) to the end wall 26 of the housing 12.

In preferred embodiments, the trays 10 are made in a standard size regardless of the size of the stack of photographs to be contained within the tray 10. Therefore, as shown in FIGS. 11 and 12, a convenient organizing rack 100 in accordance with an embodiment of the present invention can be utilized to hold a plurality of trays 10. The trays 10 are slid into tray slots 102 of the organizer rack 100 with the lifting member 30 inserted towards the back wall of the organizer rack 100. The organizer rack 100 protects the photographs and trays 10 from falling out when not being used and tends to minimize the amount of dust and dirt that can collect on the photographs and trays 10. In preferred embodiments, the end wall 26 of the base housing 12 is exposed so that the user can easily view information indicating what is stored in the photograph display and storage trays 10 that are contained within the organizer rack 100.

In particular embodiments, the organizer racks 100 are sized and shaped so that they may be stacked one on top of another. This provides a modular photograph display and storage system. For example, the top 104 of the organizer rack 100 is adapted to fit an inset base 106 of another organizer rack 100 so that a plurality of modules can be stacked together. In preferred embodiments, the organizer racks 100 are secured to the adjacent organizer racks by friction. However, in alternative embodiments, the organizer racks may be secured together by adhesives, hook and loop tape, tabs and slots, or the like. In further alternative embodiments, the exterior of the organizer rack 100 can be modified to hold and display one or more trays 10 on the side of the organizer rack 100 to improve the storage capacity and provide additional display opportunities.

The use of a organizer rack 100 and a plurality of trays 10 allows the user to identify the location of a particular tray 10 and its contents, remove the tray 10 from the organizer rack 100, quickly sort through the stack of photographs contained within the tray 10, and display a selected photograph in that tray 10 on a desk or a wall. When the user is finished viewing or displaying the tray 10, the user removes and stores the frame support tab 58, if necessary, and then slides the tray 10 back into a tray slot 102 for storage. The user can then select another tray and repeat the above steps. Thus, the trays 10 are stacked and stored in a manner similar to that of compact disks, video tapes, audio tapes or the like.

To use the tray, a stack of photographs is first placed within the recess formed within the base housing 12 and then the transparent cover 14 is placed over and coupled to the housing 12. As shown in FIG. 13(*a*), the user holds the tray 10 in one hand 112 and uses the other hand 114 to grasp the top photograph 116 in the stack of photographs 118 through the notch 20 in the transparent cover 14. Then, as shown in FIG. 13(*b*), the user slides the photograph 116 through the slot 56 formed between the transparent cover 14 and the top of the guidance tabs 32 and 34, where it can be grasped by the fingers of the user's hand 114 and pulled out from the stack of photographs 118 to expose the next photograph in the stack. The photograph 116 is removed from the stack of photographs as shown in FIG. 13(*c*). Then, as shown in FIG. 13(*d*), the photograph 116 is returned to the bottom of the stack of photographs 118 by pushing the photograph 116 back into the tray 10. The photograph 116 engages the lifting member 30 and/or the guidance tabs 32 and 34 when the user's hand 114 presses the photograph 116 into the side of the tray 10. When the photograph 116 contacts the lifting member 30 and the guidance tabs 32 and 34, the photograph 116 is guided into and passes through the slot 36 between the bottom 28 of the housing 12 and the bottom of the guidance tabs 32 and 34. As shown in FIG. 13(*e*), the photograph 116 then slides under the bottom of the stack of photographs 118 and over the lifting member 30. The user continues to push the photograph 116 into the tray 10, until the photograph 116 is stopped by the end wall 26 of the housing 12 and the end of the photograph 116, held by the user's hand 114, passes by the guidance tabs 32 and 34 so that the photograph 116 is lifted and positioned above the slot 36 along with the other photographs in the stack of photographs 118. The steps shown in FIGS. 13(*a*)–13(*e*) are repeated as the user circulates through the stack of photographs 118.

FIGS. 14–19 show a photograph display and storage tray 200 in accordance with a second embodiment of the present invention. This embodiment is similar to the tray 10 described above, and like numbers on tray 10 describe the like parts on this embodiment of tray 200. However, the tray 200 is designed to hold a stack of photographs with smaller dimensions than the stack of photographs contained in the tray 10 described above. For example, the tray 200 may be adapted to hold 3.5"×5" photographs, compared to 4" ×6" held in a tray 10.

The tray 200 has a modified housing base 12, in which the side walls 22 and 24, and the end wall 26 forming the recess in the housing 12 are closer together to hold smaller photographs. However, the outer dimensions of the frame members 46, 48, 50, 52, and 54 are maintained so that the tray 200 can be stored in an organizer rack 100 that holds trays 10. This is accomplished by forming two side extension members 202 and 204, and an end extension member 206 that connects the frame members with the side walls 22 and 24, and the end wall 26 of the housing 12. This embodiment is only required if a user wants to store different size photographs in the same organizer rack 100. Otherwise, a user can use different size trays 10, each adapted for different size photographs and each with a corresponding sized organizer rack 100 designed for a particular sized tray 10.

In preferred embodiments of the tray 200, the end wall 26 includes a negative slot 208, which is provided to permit one end of the negatives to extend past the end wall 26. The slot 208 is needed, since negatives are typically cut in standard lengths, and the smaller recess of the tray 200 would tend to cause the negatives to extend beyond the lifting member 30. This could subject the negatives to wear or damage, while extending the negatives beyond the end wall 26 still affords protection for the negatives from the overhanging frame member 54 and the extension member 206.

FIG. 20 illustrates a display and storage tray 220 in accordance with a third embodiment of the present invention. This embodiment is formed from chipboard, cardboard, paper or the like, and appears like a folded carton. The upper panel 222 has a hole cut out of it, and an acetate lens 224 cemented into the hole. Also, the lifting member 226 is a plastic spring device that is cemented to the bottom panel 228 of the tray 220. In alternative embodiments, the lens 224 may be omitted and the stack of photographs are retained by the lip formed by the upper panel 222. In further alternative embodiments, the plastic spring device of the lifting member 226 is replaced with a stationary ramp made out of chipboard, cardboard, paper, or the like. For example, the tray 220 could be made out of cardboard and simply folded into shape by a photograph developer prior to delivery to a customer.

FIG. 21 shows a display and storage tray 240 in accordance with a fourth embodiment of the present invention. This embodiment is molded or vacuum formed from polypropelene, or the like, and has a hinge 242 between the top portion 244 and the bottom portion 246. In operation, the user places a stack of photographs in the bottom portion 246 and folds the top portion 244 over the stack of photographs. In preferred embodiments, the top portion 244 is held to the bottom portion 246 by snap closures 248 and snap holes 250. However, in alternative embodiments, different closure techniques, such as friction, adhesives, hook and loop tape or the like may be used. In other alternative embodiments, a transparent cover may be omitted. Also, the tray 240 may use a spring device or a ramp design to lift the bottom of the stack of photographs.

FIG. 22 illustrates a display and storage tray 260 in accordance with a fifth embodiment of the present invention. This embodiment omits a lens and utilizes short integral tabs 262 protruding from the base housing 264 to retain the stack of photographs within the tray 260.

FIG. 23 shows a display and storage tray 280 in accordance with a sixth embodiment of the present invention. The housing 282 is formed a s U-shaped frame adapted to hold a stack of photographs. At the open end of the U-shaped frame, a lifting member 284 is formed integrally or attached to lift one end of the stack of photographs so that the U-shaped frame 282 retains the photographs within the tray 280.

FIG. 24 shows a display and storage tray 300 in accordance with a seventh embodiment of the present invention. This tray is similar to the tray 10. However, the tray 300 has an additional end wall 302 and frame member 304 hinged to the lifting member 30. This end wall 302 is folded inward to close off the open end of the tray 300 when the photographs are to be displayed or stored, and folded down when the user searches through the stack of photographs contained within the tray 300.

FIG. 25 shows a display and storage tray 320 in accordance with an eighth embodiment of the present invention. This tray 320 is formed of a sleeve of clear plastic or the like, with an attached or integral lifting member 322. In alternative embodiments, the top is formed from one material, such as plastic; and the bottom and side walls are formed from another material, such as wood, metal, plastic, ceramic, cardboard, or the like. To store negatives in this embodiment, the ramp is folded outward, the negatives are then placed in the sleeve, and the ramp is then folded back. In alternative embodiments, the negatives are inserted on either side of the lifting member 322 and then slid behind and secured by the lifting member 322.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A photograph display and storage tray for a stack formed by a plurality of photographs, the tray comprising:

a unitary housing having an interior that forms a recess adapted to hold the stack of the plurality of photographs;

a retaining member coupled to the housing to retain the stack of the plurality of photographs within the recess of the housing;

at least one guiding member coupled to the housing;

a first opening slot formed between the at least one guiding member and the retaining member, the first opening slot being adapted to permit removal of one of the plurality of photographs from the stack and the photograph display and storage tray at a time;

wherein the at least one guiding member is for guiding the one photograph to a bottom of the stack of the plurality of photographs when the one photograph is to be placed back in the stack of the plurality of photographs and the photograph display and storage tray;

a second opening slot formed between a back of the housing and the at least one guiding member, the second opening slot being adapted to permit insertion of one or more photographs into the stack of the plurality of photographs and the photograph display and storage tray; and a lifting member coupled to the housing to press against the bottom of the stack of the plurality of photographs to maintain the stack of the plurality of photographs within the recess of the housing, wherein the one photograph is removed from and inserted back into the stack of the plurality of photographs independent of moving parts.

2. A tray according to claim 1, wherein the retaining member forms a lip that overlaps edges of the stack of the plurality of photographs to hold the stack in the recess of the housing.

3. A tray according to claim 1, wherein the retaining member is a transparent cover that covers the recess in the housing and the stack of the plurality of photographs.

4. A tray according to claim 3, wherein the transparent cover is removable to permit easy insertion of the stack of the plurality of photographs.

5. A tray according to claim 4, wherein the tray is formed from plastic materials, and wherein the housing, the at least one guiding member and the lifting member are formed from a single piece of the plastic materials.

6. A tray according to claim 1, wherein a back surface of the housing is configured to form a channel with an opening from the interior to an exterior of the housing to hold negatives for the plurality of photographs.

7. A tray according to claim 6, wherein the channel is formed by a pair of indentations formed in the back surface of the housing, and wherein the pair of indentations extend into the recess of the housing to also support the stack of the plurality of photographs.

8. A tray according to claim 1, further including a frame support tab, and wherein a bottom surface of the housing has at least one tab slot for receiving the frame support tab such that the tray is supportable in an orientation that permits it to be used as a photograph frame.

9. A photograph display and storage tray for a stack formed by a plurality of photographs, the tray comprising:

- a unitary housing having an interior that forms a recess adapted to hold the stack of the plurality of photographs, wherein a back surface of the housing is configured to form a channel with an opening from the interior to an exterior of the housing to hold negatives for the plurality of photographs;
- a transparent cover coupled to the housing to cover and retain the stack of the plurality of photographs within the recess of the housing;
- at least one guiding member coupled to the housing;
- a first opening slot formed between the at least one guiding member and the retaining member, the first opening slot being adapted to permit removal of one of the plurality of photographs from the stack and the photograph display and storage tray at a time;
- wherein the at least one guiding member is for guiding the one photograph to a bottom of the stack of the plurality of photographs when the one photograph is to be placed back in the stack of the plurality of photographs and the photograph display and storage tray;
- a second opening slot formed between a back of the housing and the at least one guiding member, the second opening slot being adapted to permit insertion of one or more photographs into the stack of the plurality of photographs and the photograph display and storage tray; and
- a lifting member coupled to the housing to press against the bottom of the stack of the plurality of photographs to maintain the stack of the plurality of photographs within the recess of the housing,
- wherein the one photograph is removed from and inserted back into the stack of the plurality of photographs independent of moving parts.

10. A tray according to claim 9, wherein the transparent cover is removable to permit easy insertion of the stack of the plurality of photographs.

11. A tray according to claim 9, wherein the tray is formed from plastic materials, and wherein the housing, the at least one guiding member and the lifting member are formed from a single piece of the plastic materials.

12. A tray according to claim 9, wherein the channel is formed by a pair of indentations formed in the back surface of the housing, and wherein the pair of indentations extend into the recess of the housing to also support the stack of the plurality of photographs.

13. A tray according to claim 9, further including a frame support tab, and wherein a bottom surface of the housing has at least one tab slot for receiving the frame support tab such that the tray is supportable in an orientation that permits it to be used as a photograph frame.

14. A display and storage tray for a stack formed by a plurality of planar elements, the tray comprising:

- a unitary housing having an interior surface that forms a recess adapted to hold the stack of the plurality of planar elements;
- a retaining member coupled to the housing to retain the stack of the plurality of planar elements within the recess of the housing;
- at least one guiding member coupled to the housing;
- a first opening slot formed between the at least one guiding member and the retaining member, the first opening slot being adapted to permit complete removal of one of the plurality of planar elements from the stack and the display and storage tray at a time;
- wherein the at least one guiding member is for guiding the one completely removed planar element to a bottom of the stack of the plurality of planar elements when the one completely removed planar element is to be placed back in the stack of the plurality of planar elements and the display and storage tray;
- a second opening slot formed between a back of the housing and the at least one guiding member, the second opening slot being adapted to permit insertion of one or more planar elements into the stack of the plurality of planar elements and the display and storage tray; and
- a lifting member coupled to the housing to press against the bottom of the stack of the plurality of planar elements to maintain the stack of the plurality of planar elements within the recess of the housing,
- wherein the one planar element is removed from and inserted back into the stack of planar elements independent of sliding parts.

15. A tray according to claim 14, wherein the retaining member forms a lip that overlaps the stack of the plurality of planar elements to hold the stack in the recess of the housing.

16. A tray according to claim 14, wherein the retaining member is a transparent cover that covers the recess in the housing and the stack of the plurality of planar elements.

17. A tray according to claim 16, wherein the transparent cover is removable to permit easy insertion of the stack of the plurality of planar elements.

18. A tray according to claim 14, wherein the tray is formed from plastic materials, and Wherein the housing, the at least one guiding member and the lifting member are formed from a single piece of the plastic materials.

19. A tray according to claim 14, further including a frame support tab, and wherein a bottom surface of the housing has at least one tab slot for receiving the frame support tab such that the tray can supported in an orientation that permits it to be used as a frame.

\* \* \* \* \*